United States Patent [19]

Botsolas

[11] Patent Number: 5,024,249
[45] Date of Patent: Jun. 18, 1991

[54] SPECIALIZED ONE-PIECE PIPEFITTING COVER FOR INSULATED STRAINER AND LATERAL 45 DEGREE -Y

[75] Inventor: Christos J. Botsolas, Clearwater, Fla.

[73] Assignee: Carol Botsolas, St. Petersburg, Fla.

[21] Appl. No.: 352,871

[22] Filed: May 17, 1989

[51] Int. Cl.$^5$ .............................................. F16L 59/16
[52] U.S. Cl. ..................................... 138/110; 138/128; 138/147; 138/149; 138/178; 285/45; 428/192
[58] Field of Search ............... 138/99, 110, 178, 149, 138/157, 158, 147, 128; 285/45, 155; 137/375; 428/192

[56] References Cited

U.S. PATENT DOCUMENTS

| 291,371 | 1/1884 | Mayall | 138/151 |
|---|---|---|---|
| 903,959 | 11/1908 | Crary | 285/155 |
| 2,160,009 | 5/1939 | Walker | 138/149 |
| 2,324,181 | 7/1943 | Tulien | 138/147 |
| 3,455,336 | 7/1969 | Ellis | 138/158 |
| 3,495,629 | 2/1970 | Botsolas et al. | 138/149 |
| 3,537,486 | 11/1970 | Hullhorst | 138/178 |
| 3,559,694 | 2/1971 | Volberg | 138/147 |
| 3,598,157 | 8/1971 | Farr et al. | 138/157 |
| 3,732,894 | 5/1973 | Botsolas | 138/178 |
| 3,877,491 | 2/1972 | Thastrup | 138/149 |
| 3,960,180 | 6/1976 | Andersson | 138/110 |
| 3,960,181 | 6/1976 | Baur et al. | 285/45 |
| 4,093,683 | 6/1978 | Harley | 138/156 |
| 4,139,026 | 2/1979 | Zack | 138/178 |
| 4,205,105 | 5/1980 | Blundell | 138/178 |
| 4,463,780 | 8/1984 | Schultz et al. | 138/178 |
| 4,553,308 | 11/1985 | Botsolas | 138/178 |
| 4,669,509 | 6/1987 | Botsolas | 138/178 |
| 4,807,669 | 2/1989 | Prestidge, Sr. | 138/178 |
| 4,830,060 | 5/1989 | Botsolas | 138/149 |
| 4,830,061 | 5/1989 | Karakawa | 138/110 |
| 4,838,318 | 6/1989 | Karakawa | 137/375 |

FOREIGN PATENT DOCUMENTS

| 906980 | 8/1972 | Canada | 137/375 |
|---|---|---|---|
| 429339 | 7/1967 | Switzerland | 138/149 |
| 1220515 | 1/1971 | United Kingdom | 285/155 |

Primary Examiner—Philip R. Coe
Assistant Examiner—Charles Cooley
Attorney, Agent, or Firm—Hedman, Gibson, Costigan & Hoare

[57] ABSTRACT

A one piece pipefitting cover for insulated Y-shaped joints, including strainers or lateral 45°-Y fittings, made of a flexible material, i.e., polyvinyl chloride, comprising a relatively flat base symmetrical about its center axis having oppositely facing lateral members and semicircular edge members along its sides wherein when rotated about its center axis forms a cover conforming to the shape of the insulated fitting.

7 Claims, 2 Drawing Sheets

SPECIALIZED ONE-PIECE PIPEFITTING COVER FOR INSULATED STRAINER AND LATERAL 45 DEGREE -Y

FIELD OF THE INVENTION

The present invention is directed to a novel cover for covering an angled pipe joint, and more particularly, to a specialized pipefitting cover adapted to snugly enclose an insulated, generally Y-shaped pipe joint.

BACKGROUND OF THE INVENTION

It is desirable in the insulation industry to be able to install insulation not only on straight pipes but on specialized segments such as elbows, T's, valves, flanges, S-bends, Y-branches, strainers, unions, and various other fittings. Flexible insulation that can be wrapped about specialized fittings has long been known and, pipefitting covers have been developed to enclose the insulation to surround and protect the insulation, e.g., from moisture, tears, fire, etc., and to present a neat, aesthetically pleasing covered fixture.

Improvements in pipefitting covers are described in several patents, e.g., U.S. Pat. No. 3,495,629, U.S. Pat. No. 3,732,894, U.S. Pat. No. 4,553,308, U.S. Pat. No. 4,669,509, and Ser. No. 123,589, filed Nov. 20, 1987, all of which are incorporated herein by reference, in which a variety of pipefittings have been provided with standardized one or two-piece protective and attractive covers. U.S. Pat. No. 3,732,894, for example, provides a pipefitting cover for a T-joint made of two T-shaped halves, pivotally connected by rivets or screws, which fit over and enclose a T-shaped pipefitting covered by insulation.

Although specialized covers for many types of pipefittings are known, there remains a need for a protective and attractive pipefitting cover for Y-shaped joints, such as strainers having a "dirt leg", wherein a straight segment of pipe is connected to a second pipe (or dirt leg) which diverges from the first pipe at an angle. Ser. No. 123,589 discloses a Y-shaped cover formed of two sections formed in the shape of the Y-shaped fitting to be covered and provided with a hinge to enable the fitting cover to open and surround the fitting.

The prior art also includes fitting covers formed in a first shape different from the fitting to be covered and the capacity to be transformed into a second shape conforming to the fitting. An example of that fitting is seen in U.S. Pat. No. 3,495,629.

SUMMARY OF THE INVENTION

Accordingly, it is an object of the present invention to provide an efficient pipefitting cover for insulated Y-shaped joints.

It is a further object of the present invention to provide a one-piece fitting cover which is fabricated from a thermoplastic resin, specifically including polyvinyl chloride, and is easily installed over a pipefitting.

It is a further object of the present invention to provide a one-piece fitting cover having the capacity to cover a variety of Y-shaped fittings and accommodate various diameters of insulated pipe extending from the same fitting.

It is a still further object of the invention to provide a fitting cover that can be integrally formed by blow molding a flexible plastic material.

It is another object of the invention to provide an essentially flat member that can be formed into the Y-shaped fitting cover by rotation about a central axis.

Another object of the invention is to provide a fitting cover for Y-shaped fittings that is formed in a flat shape that can be nested with various size covers for shipping and storage.

These and other objects are attained herein by a pipefitting cover which, in essence, is formed in an essentially flat first shape that can be rotated around a central axis into a second shape having the configuration of a strainer or lateral 45° -Y fitting.

In practice, the cover of the present invention is sized to be installed over a range of insulation thicknesses and pipe thicknesses by virtue of the inherent design of the cover. The pipefitting covers of the present invention are also easily assembled, and efficiently secured in place by a variety of means.

DESCRIPTION OF THE DRAWINGS

The accompanying drawings, referred to herein and constituting a part hereof, illustrate preferred embodiments of the invention and, together with the description, serve to explain the principles of this invention without being intended to limit the invention in any manner whatsoever.

DESCRIPTION OF THE PREFERRED EMBODIMENT

The cover of the subject application is suitable for use in any piping installation where angular protrusions from a straight pipe occur. The cover of the present invention has been developed specifically for covering strainers. Thus, the invention will be described in the embodiment of a one-piece strainer and lateral 45° -Y cover.

Figure 1:
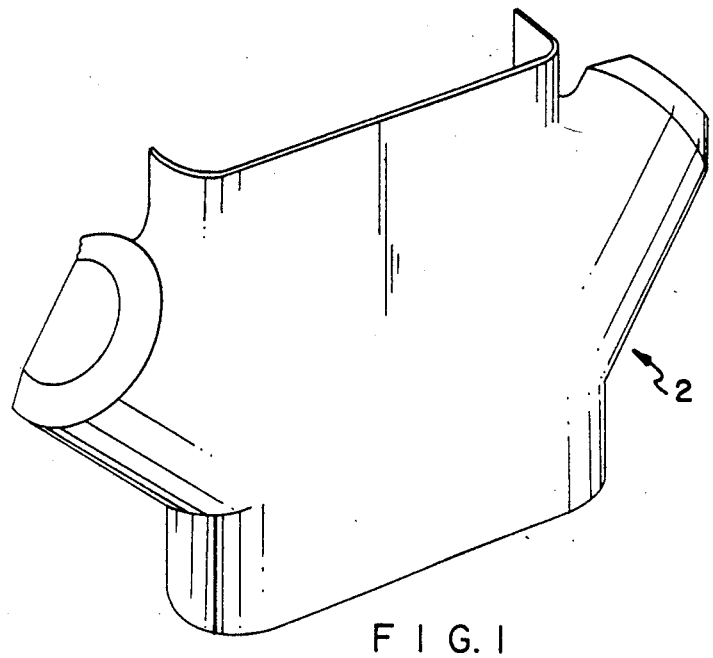
FIG. 1 is a perspective view of the one-piece fitting of the subject invention.

As best seen in FIG. 1, the cover 2 of the subject invention is a one-piece structure formed of a flexible material which affords bending under stress while maintaining the pre-formed shape when no stress is applied. Suitable construction materials affording limited flexibility, dimensional stability, and desirable impact strength, as well as providing a smooth, attractive surface, include vinyl resins, in particular polyvinyl chloride. The preferred thickness is about 0.01 inches and the preferred material is a polyvinyl chloride material of the type currently known as Geon-45, a BF Goodrich polyvinyl chloride designation.

Figure 5:
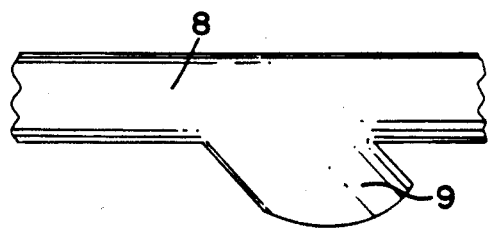
FIG. 5 is a drawing of a conventional strainer assembly which the cover of the subject invention is applied.
Figure 6:
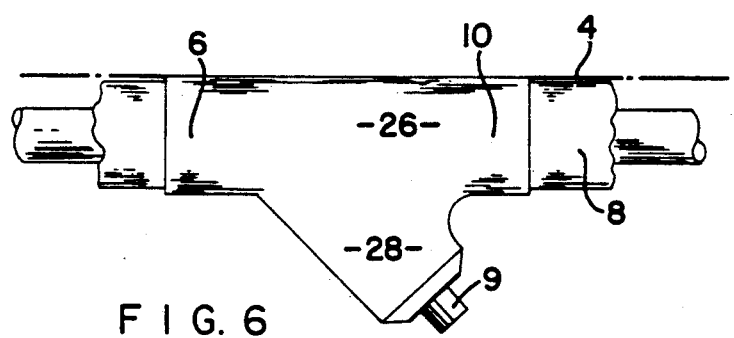
FIG. 6 is the fitting of FIG. 1 shown rotated about a central axis into the final one-piece cover in its ultimate application.

The configuration of the fitting cover is critical in that upon rotation through a centerline axis 4, the fitting cover 2 will take the three-dimensional configuration of the Y-shaped strainer shown in FIGS. 5 and 6.

Figure 2:
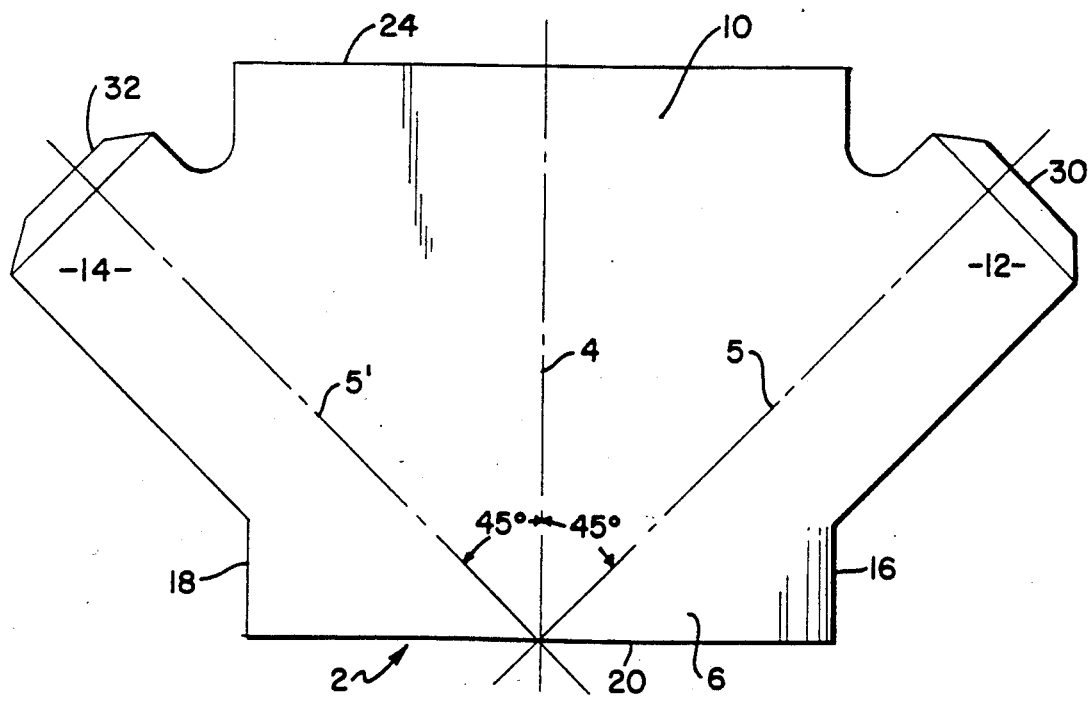
FIG. 2 is a top elevational view of the one-piece fitting of the present invention.
Figure 3:
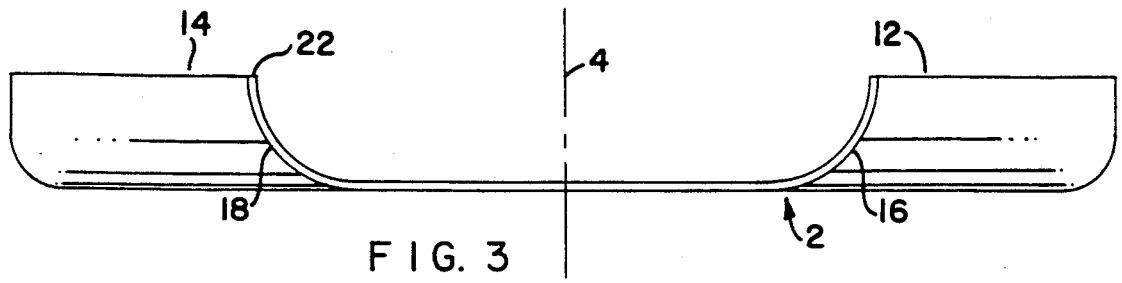
FIG. 3 is a front elevational view of the one piece fitting of the subject invention.
Figure 4:
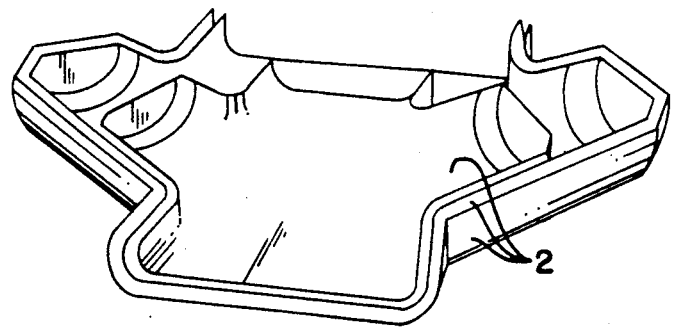
FIG. 4 is a plan view of five variously sized fittings of the present invention shown in a nested mode.

As best seen in FIGS. 2 and 3, the fitting cover configuration is formed with a symmetrical shape having a base 6 that conforms to the pipe 8 at the obtuse angle end of the angular protrusion 9 and a base 10 conforming to the pipe 8 at the acute angle end. In addition, the symmetrical structure is provided with two lateral members 12 and 14, also being essentially identical, which extend at 45° angles from the axis 4 along the axes 5 and 5'. These lateral members 12 and 14 correspond, when the base has been rotated about the axis 4, to the angular protrusion 9 from the pipe 8.

The base members 6 and 10 and the sides of the lateral members 12 and 14 are provided with edge members 16 and 18 that extend continuously from the bottom edge 20 to top edge 24 of cover 2. The edge members 16 and 18 are semi-circular in shape and extend greater than 90° from the surface of the base 6 and 10 to the top 22 of the edge members 16 and 18 (see FIG. 3). The radius of the edge members 16 and 18 relates generally to the radius of the fitting to be covered. The bottom and top edges 20 and 24 of the cover are open, i.e. without edge members, for effecting rotation about the pipe 8.

The radius of the edge members 16 and 18 is dependent on the diameter of the insulated pipe 8 and protrusion 9, as stated above. The larger the diameter, of the fitting, the larger the radius of the edge members 16 and 18 must be to fully encircle the insulated pipe 8 and protrusion 9. Also, the semi-circular form of the edge members 16 and 18 should be greater than 90° to allow the cover to fit various size fittings and to overlap to some extent about the pipe 8 and protrusion 9, to provide improved attachment of the cover 2 about the Y-shaped fitting.

As best seen in FIG. 6, the base 6 and 10 and all points along the center axis 4 contact the pipe or insulated pipe 8 when the cover 2 is rotated about the axis 4. The lateral members 12 and 14 come together to form a cylindrical extention 28 which encloses the extention of the Y-shaped protrusion 9. Although the angular protrusion 9 is shown in FIG. 6 protruding through the terminating end of the extension 28, comprising the ends 30 and 32 of lateral members 12 and 14 (see FIG. 2), it is understood that the terminal end of extension 28 could also be sealed to totally enclose the extension 9.

Once rotated to where the base members 6 and 10 come together to form a relatively cylindrical member 26 about the pipe 8 and the lateral members 12 and 14 come together to form a relatively cylindrical member 28 about the protrusion 9, the overlapping edge members 16 and 18 are joined to form a unitary whole (see FIGS. 5 and 6).

The joined cover 2 is secured by a securing means which includes one or more of a variety of closures including, but not limited to, adhesive tapes, tacks, rivets, screws, cements, tab locks or the like in accordance with the application and environment of use. For example, in applications where the pipefitting cover may be installed as a permanent fixture, adhesives or cements are preferred to secure the cover 2. In such applications the seam and all edges can be caulked, e.g., with silicone caulking, especially where the fitting is outdoors and is subsequently exposed to the elements.

As explained above, the edge members 16 and 18 are intended to overlap when the cover 2 is rotated to its closed position. This, however, does not necessitate that one of the lateral members 12 or 14 be smaller than the other due to the intended flexibility of the cover material, i.e. PVC.

In accordance with the foregoing disclosure, specialized pipefitting covers may be fabricated to accommodate an infinite variety of generally Y-shaped joints having a straight pipe section and an additional pipe section protruding therefrom at an angle. The preferred embodiments described herein are particularly suitable for enclosing insulation-wrapped standard strainer joints having a dirt leg protruding at an angle of about 45°. However, it will be understood that the pipefitting cover of this invention may be sized to accommodate any size or configuration of generally Y-shaped joint, and sized to accommodate such joints covered by any of a wide array of insulating materials or multiple layers of such insulating materials.

The invention in its broader aspects is not limited to the specific embodiments described above and in the accompanying drawings. Departures may be made from the specific embodiments which are within the scope of the appended claims without departing from the principles of the invention and without sacrificing its chief advantages.

I claim:

1. A one-piece pipe fitting over for strainers and lateral 45° -Y fittings comprising an essentially flat base, symmetrical about a center axis, with a centrally disposed section having a top, a bottom and sides and two oppositely facing Y-sections extending from said sides, the ends of said Y-sections terminating in a flat edge, said base terminating on the sides, including the sides of the Y-sections, with edge members extending from said base in a semi-circular form to greater than 90° from the flat plane of said base, the radius of said semi-circle relating generally to the radius of the fitting about which the cover conforms, the top and bottom of said base being without said edge members, wherein said cover comprises a thermoformed plastic whereby when rotated about the center axis said cover provides a configuration essentially the same as the Y-shaped fitting with an overlap of the edge members and further comprising means for attaching the cover about said fitting.

2. A one-piece pipe fitting cover as defined in claim 1 wherein the thermoformed plastic is a thermoplastic vinyl resin.

3. A one-piece pipe fitting cover as defined in claim 2 wherein the thermoplastic vinyl resin is poly vinyl chloride.

4. A one-piece pipe fitting cover as defined in claim 3 wherein the poly vinyl chloride has a thickness of about 0.01 inches.

5. A one-piece pipe fitting cover as defined in claim 1 wherein the means for attaching the cover about said fitting is taken from the group consisting of adhesives, tapes, rivets, screws, cements and the like.

6. A one-piece pipe fitting cover as defined in claim 1 wherein a single cover is capable of covering a number of fittings of limited different sizes.

7. A one-piece pipe fitting cover as defined in claim 1 wherein said cover is stackable within similar covers for covering larger fittings.

* * * * *